US009398268B2

United States Patent
Singh et al.

(10) Patent No.: US 9,398,268 B2
(45) Date of Patent: Jul. 19, 2016

(54) METHOD AND SYSTEM FOR COOPERATIVE DIVERSITY VISUAL COGNITION IN WIRELESS VIDEO SENSOR NETWORKS

(75) Inventors: Maneesh Kumar Singh, Lawrenceville, NJ (US); Cristina Comaniciu, Princeton Junction, NJ (US); Dorin Comaniciu, Princeton Junction, NJ (US); Stefan Kluckner, Graz (AT)

(73) Assignees: Siemens Corporation, Iselin, NJ (US); Siemens Aktiengesellschaft Osterreich, Vienna (AT); The Trustees of the Stevens Institute of Technology, Hoboken, NJ (US)

( * ) Notice: Subject to any disclaimer, the term of this patent is extended or adjusted under 35 U.S.C. 154(b) by 1092 days.

(21) Appl. No.: 13/480,064

(22) Filed: May 24, 2012

(65) Prior Publication Data

US 2012/0300068 A1  Nov. 29, 2012

Related U.S. Application Data

(60) Provisional application No. 61/489,817, filed on May 25, 2011.

(51) Int. Cl.
H04N 7/15 (2006.01)
H04N 7/18 (2006.01)

(52) U.S. Cl.
CPC .................................. H04N 7/181 (2013.01)

(58) Field of Classification Search
CPC ... G01S 13/726; G01S 13/867; G01S 3/7864; G06T 2207/30232; G06T 7/2093; G06T 1/0007; G08B 13/19608; G08B 13/19645
USPC ............................................ 348/148; 382/103
See application file for complete search history.

(56) References Cited

U.S. PATENT DOCUMENTS

| | | | |
|---|---|---|---|
| 7,149,325 B2* | 12/2006 | Pavlidis et al. ............... | 382/103 |
| 2003/0060216 A1* | 3/2003 | Kamel et al. .................. | 455/457 |
| 2003/0063585 A1* | 4/2003 | Younis et al. ................. | 370/331 |
| 2006/0167654 A1* | 7/2006 | Keinan et al. ................. | 702/181 |
| 2007/0101382 A1* | 5/2007 | Aramaki et al. .............. | 725/105 |
| 2010/0208941 A1* | 8/2010 | Broaddus et al. ............. | 382/103 |
| 2012/0203918 A1* | 8/2012 | Berenberg et al. ............ | 709/229 |

OTHER PUBLICATIONS

"A cooperative game-theoretic measurement allocation algorithm for localization in unattended ground sensor networks" Ghassemi et al. 2008 IEEE.*
"Fair Allocation of Sensor Measurements Using Shapley Value" Byun et al., 2009 IEEE.*

* cited by examiner

*Primary Examiner* — Sath V Perungavoor
*Assistant Examiner* — Nathnael Aynalem
(74) *Attorney, Agent, or Firm* — Peter Kendall

(57) ABSTRACT

A method and system for cooperative diversity visual cognition in a wireless sensor network is disclosed. The method and system are capable of solving distributed visual cognition tasks (for example, online simultaneous reconstruction of 3D models of a large area) by using multiple video streams and exploiting cooperative diversity video sensing information while ensuring an optimal tradeoff between energy consumption and video quality of images received from said multiple video streams.

24 Claims, 5 Drawing Sheets

METHOD AND SYSTEM FOR COOPERATIVE DIVERSITY VISUAL COGNITION IN WIRELESS VIDEO SENSOR NETWORKS

This application claims the benefit of U.S. Provisional Application No. 61/489,817, filed May 25, 2011, the disclosure of which is herein incorporated by reference.

BACKGROUND OF THE INVENTION

The present invention relates to optimization of wireless video sensor networks. More specifically, the present invention relates to optimization of wireless video sensor networks with limited resources to ensure optimal performance for a visual cognition problem at hand. The phrase visual cognition is meant to include but not limited to problems spanning from 3D model reconstruction to higher level cognitive tasks entailed in visual intelligence, surveillance, reconnaissance and other higher level cognition activities that the network is tasked to perform—for example, multi-camera tracking of targets.

Wireless Video Sensor Networks (WSN), designed for gathering real-time visual intelligence, are of increasing importance for a number of areas of application, such as disaster recovery and rescue operations, law enforcement, and, most notably, military operations. Generally, WSN refers to any type of computer network comprising a plurality of signal sensors that is not connected by cables of any kind and that may typically cover large areas, such as cities, regions, and continents. A typical WSN contains one or more servers, base station gateways, access points, wireless bridging relays, and sensor nodes. While being capable of providing its users with intelligent video analytics support in service of the specified visual cognition task, the challenge for WSN is to be able to self-organize, self manage its energy resources, and re-configure to respond to dynamically changing conditions.

BRIEF SUMMARY OF THE INVENTION

The present invention provides a method and system for cooperative diversity visual cognition in Wireless Video Sensor Networks (WSN).

In one embodiment, the WSN is assigned an appropriate visual cognition task. In service of this task, a request for a video image of an area is received by at least one video sensor node deployed in the area. An estimate of a performance metric for the task based on the contribution of at least one video sensor node to the fulfillment of the request is determined by at least one video sensor node. It is determined by at least one video sensor node whether to join a communicative coalition with at least one other video sensor node in the area to fulfill the request based on the determined estimate of the performance metric of the at least one video sensor node. In response to determining to join the communicative coalition, the images or videos of the area are obtained by the node sensors, appropriate estimation algorithms are run and the resultant data is transmitted to a requestor by at least one video sensor node.

These and other advantages of the invention will be apparent to those of ordinary skill in the art by reference to the following detailed description and the accompanying drawings.

DETAILED DESCRIPTION

The present invention provides a method and system for cooperative diversity visual cognition in Wireless video sensor networks (WSN). Embodiments of the present invention may be employed for a plurality of purposes such as video-based Intelligence, Surveillance and Reconnaissance (ISR). Specifically, embodiments of the present invention can provide a method and system for cooperative diversity visual cognition in WSN using multiple video streams and exploiting cooperative diversity video sensing information while ensuring an optimal tradeoff between energy consumption and video quality for vision tasks like 3D reconstruction, multi-camera detection and tracking, etc.

Cooperative diversity in signal processing is used to enhance the signal quality performance based on multiple signals received at detector via cooperative relaying. According to various embodiments of the present invention, cooperative diversity visual cognition exploits independent views from multiple wireless sensor cameras (nodes), to assist with a 3D vision task (like 3D reconstruction from multiple videos) and characterizes the effectiveness of a sensor node in a sensing coalition, from a multi-objective perspective, including the objectives of Quality of Service (QoS), energy consumption, and latency.

Figure 1:
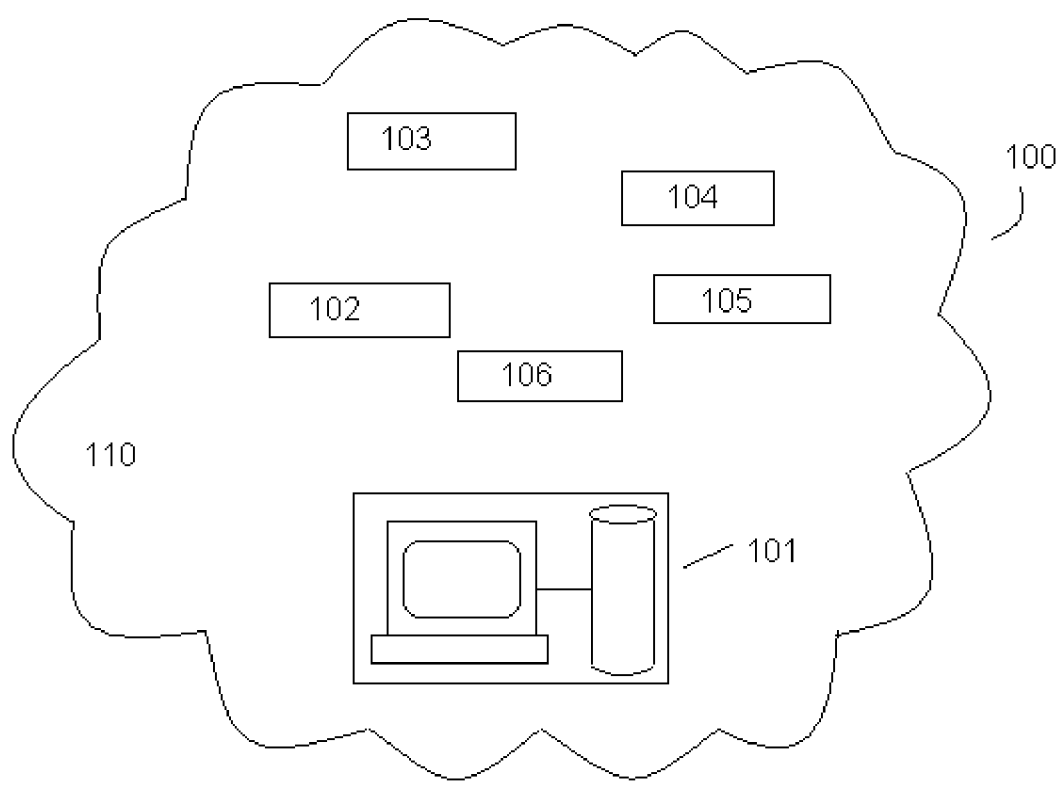
FIG. 1 illustrates an exemplary system for cooperative diversity visual cognition in wireless video sensor networks.

FIG. 1 illustrates a system 100 for cooperative diversity visual cognition in wireless video sensor networks. The apparatus comprises at least one computer system 101 configured and operable to communicate, via a wireless communication network 110, with a plurality of wireless sensor nodes 102, 103, 104, 105, and 106 deployed in an area of interest.

The computer system 101 may comprise computer processors, memory units, storage device, computer software, and other components. Specifically, the computer system 101 contains at least one processor which controls the overall operation of the computer system 101 by executing computer program instructions which define such operation. The computer program instructions may be stored in a storage device, or other computer readable medium, (e.g., magnetic disk) and loaded into memory of the computer system 101 when execution of the computer program instructions is desired. The computer system 101 may also include one or more network interfaces for communicating with other devices via the wireless communication network. The computer system 101 also includes other input/output devices. One skilled in the art will recognize that an implementation of an actual computer could contain other components as well, and that the computer system 101 depicted on FIG. 1 is a high level representation of the computer system for illustrative purposes.

The wireless communication network 110 may include, for example, the Internet, a data bus, a dedicated wireless communication link, an ad-hoc network, and/or any other communication network. The wireless communication network 110 may allow one or two way communication. The wireless communication network 110 may enable communication using, for example TCP/IP. Information may be passed though the wireless communication network 110 in any form, including for example as multiple data packets.

The plurality of video sensor nodes may include a wide variety of image-producing wireless devices. Examples of such video sensor nodes comprise video-sensing equipment worn by mobile personnel or robots or otherwise installed on high- and low-orbit aeronautical satellites, unmanned aerial vehicles (drones), aircrafts, watercraft, automobiles, general purpose computers, above-, in-, or underground structures, etc.

One skilled in the art will recognize that the system configuration of FIG. 1 is non-limiting and that components of the presented system may be combined in any way in various embodiments and may include any additional and/or desired components and/or configurations.

Figure 2:
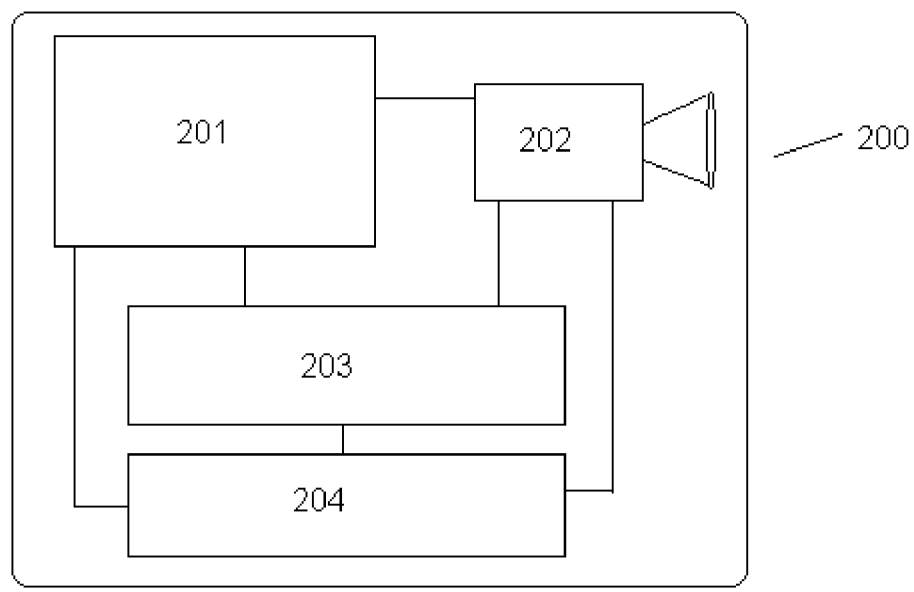
FIG. 2 illustrates an exemplary video sensor node.

FIG. 2 illustrates an exemplary video sensor node 200, according to an embodiment of the present invention. The exemplary video sensor node 200 is one of the plurality of video sensor nodes 102, 103, 104, 105, and 106 of FIG. 1. The video sensor node 200 comprises at least one processor 201, image-sensing input module 202, a signal communication receiver-transmitter 203, and power source 204. The at least one processor 201 of the video sensor node 200 is configured to conduct a number of computation tasks based on received requests from the computer system 101 of FIG. 1. The image-sensing input module 202 comprises at least one high-resolution camera configured to obtain a video image of the area upon receiving a command from the at least one processor 201. The image-sensing input module 202 of each node may also comprise a stereo head providing the requestor of images independent depth estimates. The signal communication receiver-transmitter 203 is configured to receive commands from the computer system 101 and communicate obtain video images to the computer system 101. The signal communication receiver-transmitter 203 is also configured to communicate with signal communication receivers-transmitters of other video sensor nodes 102, 103, 104, 105, and 106 deployed in the area, in accordance with various embodiments of the present invention. The power source 204 supplies power to the sensor node 200 and may be implemented as a battery or the like. It should be recognized that this example of the video sensor node is non-limiting and that any configuration of video sensor node components may be combined in any way in various embodiments. In some embodiments, for example, video sensor nodes may include any additional and/or desired components and/or configurations.

In the exemplary embodiment, a network multi-objective optimization scenario may be such that sensor nodes are randomly deployed in a battlefield (e.g. spread out from an airplane, deployed using a projectile or by hand) and start self-organizing to provide 3D sensing information from video streams, which is reported to a remote sink node that aggregates the data for the entire area and performs analytics to solve a 3D reconstruction task. The optimization objectives are the performance metrics associated with the quality of the 3D video reconstruction, the energy consumption for video transmission, and the latency of reporting. The 3D video reconstruction task may be one-shot where a 3D model of the monitored areas is estimated (reconstructed) or continuous, where the 3D model is estimated at a sequence of specified time intervals.

In an advantageous embodiment, Cooperative Diversity visual cognition exploits the inherent diversity of the wireless cameras' locations and characteristics by enlisting cooperation of multiple sensors to sense and report, and by applying intelligent video processing and fusion algorithms for sensing tasks, such as real-time detection and tracking of multiple people inhabiting the imaged areas.

The potential cooperative diversity may be characterized by "coalitions of nodes" that cooperate for joint video sensing from diverse sensory locations. A coalition of nodes may consist of a head node that aggregates local video sensing information, together with nodes that report to the head node. The head node also participates in relaying traffic towards the sink node. It should be recognized that nodes not in a coalition do not sense or report, thus saving energy.

Based on cooperative diversity gains, cost functions may be formulated to characterize the effectiveness of various coalitions of nodes. Such cost functions may be used in conjunction with energy and delay costs to formulate a multi-objective (MO) optimization problem to search for the optimal coalitional structure in the network, given a desired energy-video quality-latency tradeoff.

Figure 3:
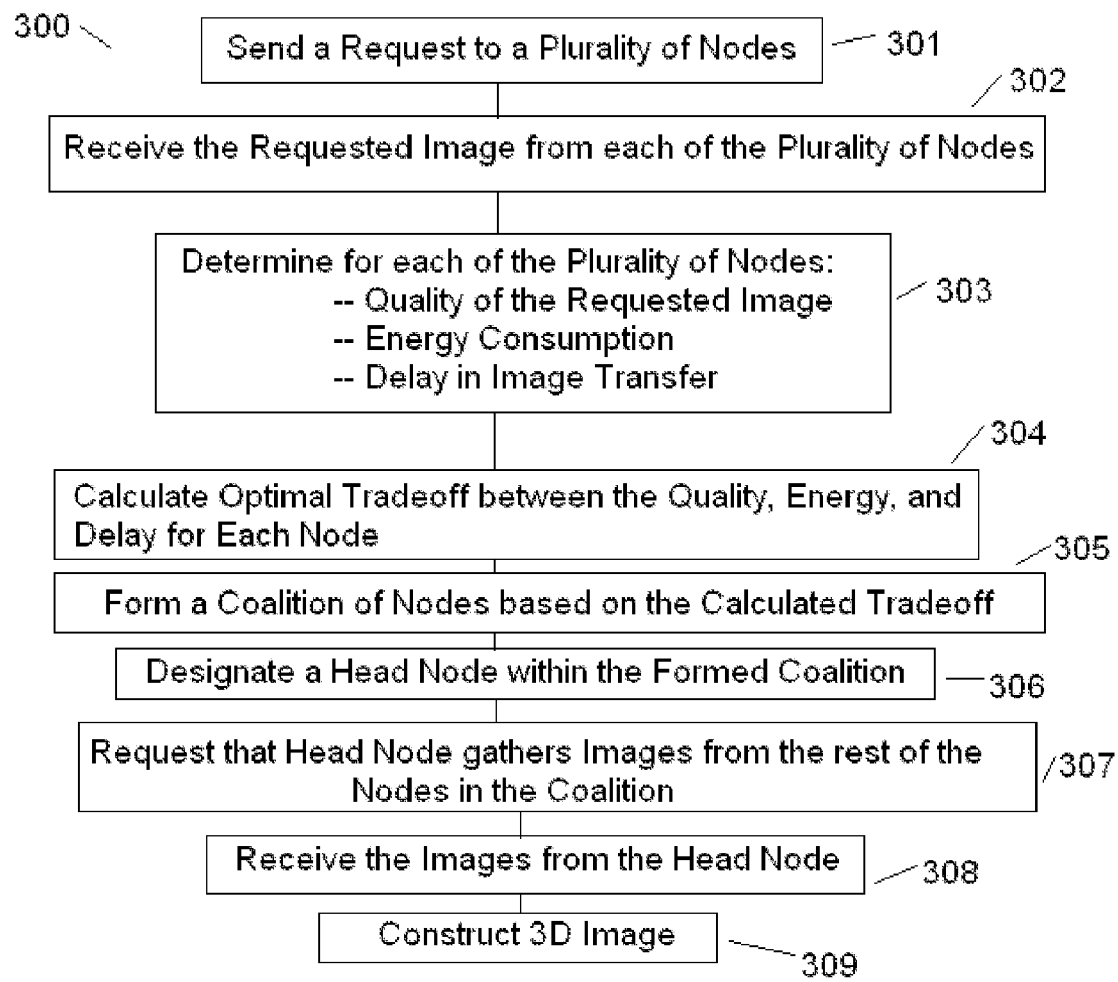
FIG. 3 illustrates a method for cooperative diversity visual cognition in wireless video sensor networks utilizing a Multi-Objective optimization framework, according to an embodiment of the present invention.

FIG. 3 illustrates a method 300 for cooperative diversity visual cognition in a wireless sensor network using a Multi-Objective optimization framework, according to an embodiment of the present invention.

At step 301, a request is sent by the computer system 101 to a plurality of video sensor nodes 102, 103, 104, 105, and 106 deployed in a particular area, where the request is for a 3D model reconstruction of the area. As may be appreciated, the request may comprise a number of parameters. In one of the embodiments, such parameters may include desired quality (e.g., maximal coverage or maximal reconstruction quality) and type (e.g., continuous feed, snap-shot of the area (one-shot), etc.) of the requested image. According to a possible implementation, the request message may be encoded and compressed before being transmitted to the plurality of video sensor nodes 102, 103, 104, 105, and 106 for the security and data integrity purposes. Such message encoding and compression can be implemented using any well-known encoding and compression techniques.

At step 302, the computer system 101 receives the requested data from the plurality of video sensor nodes 102, 103, 104, 105, and 106 where each received data contains metadata as well. According to an advantageous embodiment, metadata associated with 3D model reconstruction from each of the plurality of video sensor nodes contains at least a metric indicative of quality of the reconstructed model of the area, a metric indicative of energy consumption, and a metric indicative of delay in transmitting the image from each of the plurality of video sensor nodes.

As indicated at step 303, based on received metadata, the computer system 101 determines quality of the received data of the area, energy consumption, and delay in transmitting the data for each of the plurality of video sensor nodes 102, 103, 104, 105, and 106 where the computer system 101 receives data directly from the plurality of video sensor nodes 102, 103, 104, 105, and 106.

For synchronization and optimization purposes, according to an embodiment, the computer system 101 designates one video sensor node of the plurality of video sensor nodes 102, 103, 104, 105, and 106 to be a head node, where the head node is responsible for gathering images obtained by the rest of the plurality of video sensor nodes 102, 103, 104, 105, and 106 and for transmitting gathered images to the computer system 101.

Following the step 303, as indicated at step 304, the computer system 101 calculates, for each of the plurality of video sensor nodes 102, 103, 104, 105, and 106, an optimal tradeoff between the performance metric (or quality) associated with the visual cognition task, a metric of energy consumption, and delay in transmitting the image. The computer system 101 performs calculation of the optimal tradeoff to determine which combination of the plurality of nodes generates and transmits data of desired quality with an acceptable tradeoff in latency delay and energy consumption. The optimal tradeoff determination results in a determination of which nodes should continue to transmit image data and which node is designated as the head node.

According to an advantageous embodiment, a multi-objective optimization algorithm can be used to determine the optimal tradeoff for each node. In the multi-objective optimization algorithm, $[\chi, \phi]$ are to be considered as optimization variables that characterize a sensor node, where $\chi, \phi$=Boolean variables, $\chi=1$ if the node acts as a head node for relaying data to sink node (e.g., the computer system 101), and $\chi=0$ otherwise, and $\chi=1$ if the video sensor node should sense and report, and 0, otherwise. According to a possible implementation, the head node may not relay data directly to the computer system 101 but may relay it to an intermediary sink node.

It should be recognized that an extra computational and relaying energy may be demanded by a node which is designated as a head node. To ensure and enforce uniform energy consumption across nodes, the head node designation may be randomly rotated within the plurality of video sensor nodes, in which case the optimization variable $\chi$ would take probabilistic values, e.g. $\chi=\{0, 0.1, 0.2, \ldots, 0.9, 1\}$. The optimization vectors of variables may be defined as $\chi=[\chi_1, \chi_2, \chi_n]$, $\phi=[\phi_1, \phi_2, \phi_n]$, where n=number of nodes in the network. Determining the best coalitional structure in the network in a multi-objective setting may be formulated as finding the vectors $\chi$ and $\phi$ that belong to the Pareto optimal front characterizing the tradeoffs among several objectives. The vectors $\phi$ and $\chi$ identify whether any particular node is selected to sense and report images and whether said particular node is selected to be a head node.

An optimal Pareto front (F*) of a multi-objective (MO) problem may be defined as the set of Pareto-optimal solutions, where:

Definition 1: A solution x dominates a solution y for a n-objective MO problem if x is at least as good as y for all the objectives and x is strictly better than y for at least one objective:

$$\forall i \in [1,n]: f_i(x) \leq f_i(y), \exists j \in [1,n]: f_j(x) < f_j(y).$$

Definition 2: A solution x∈S is Pareto optimal if there is no other solution y∈S that dominates x.

An estimate of the Pareto front may be determined using MO Tabu based search algorithms that have been shown to obtain accurate estimates for a large variety of combinatorial optimization problems. The objective functions values for the multi-objective optimization are typically derived analytically based on estimates of the performance metrics accounting for physical parameters such as nodes' locations, properties of the propagation environment, camera position, light conditions, etc. The multi-objective optimization than obtains a family of solutions (possible coalitions for the nodes) that are characterized by a specified tradeoff (image quality, energy, latency). This optimization is offline, and can be done at the beginning, after the sensors are deployed and the physical parameters are learned.

Other multi-objective metaheuristic algorithms. For the present optimization problem, three objective functions may be defined, where the objective functions are related to quality for the visual cognition task, energy consumption, and latency. The energy consumption metric may be derived based on the physical layer characteristics of the system, considering the required transmission power to meet a certain frame error rate target, given the wireless propagation model, and interference distribution in the network, which is also influenced by specific implementations of the Medium Access Control (MAC). The latency objective may account for delays due to MAC scheduling and multihop routing. The objective functions are not uniquely defined and could be tailored for specific applications, by considering the relevant parameters of the wireless propagation environment and specific protocol implementations for layers 2 and above that influence interference and latency.

Returning to FIG. 3, at step 305, a coalition of video sensor nodes from the plurality of video sensor nodes, based on the optimal tradeoff determination by the computer system 101, at step 304, for each of the plurality of video sensor nodes 102, 103, 104, 105, and 106. The coalition is formed to generate a desired number of images of the area for the computer system 101 to perform a visual cognition task. In an advantageous embodiment, each video sensor node of the plurality of video sensor nodes communicates to its peers pre-encoded, handshaking wireless signals as well as the video data and other sensory metadata, such as location information, camera characteristics, interference measurements, residual energy, and routing information. One skilled in the art will understand that listed exemplary sensory metadata can be used to estimate the objective functions for the optimization. One skilled in the art will also understand that not all video sensor nodes will be used to form the coalition. If the calculated trade-off among quality of images, energy consumption, and latency for any given video sensor node will indicate that the performance metric of the participating node to the coalition is outweighed by concerns of either energy consumption or delay in transmitting images for the given video sensor node, such node will not be used to form a coalition of nodes At step 306, at least one of the plurality of video sensor nodes within said formed coalition is designated, by the computer system 101, to be the head node, based on the optimal tradeoff determination by the computer system 101 at step 304 above. The head node is configured to gather the data obtained by the rest of the plurality of video sensor nodes within the coalition and to transmit gathered data to the computer system 101. It should be recognized that in some embodiments, the computer system 101 is a recipient of the data from the head node as a sink node. In a possible implementation, the head node transmits the gathered data to the sink node which is an intermediary relay gateway between the head node and the computer system 101.

At step 307, the computer system 101 requests that the designated head node gathers the data obtained by each of the plurality of video sensor nodes and transmits the data to the computer system 101. In an embodiment of the present invention, upon receiving a request for data, the head node communicates the command to the rest of the video sensor nodes within the coalition instructing said nodes to obtain video or images of the area, perform certain analytics on the sensory data in service of a cognition task, and to transmit the computed data to the head node.

At step 308, the computer system 101 receives data from the head node. In an embodiment of the present invention, the received data may be in the form of a continuous sequence of video images of the area, a single snap shot or a plurality of snap shots of the area, infra-red images of the area, thermal images of the area and the like.

At step 309, the computer system 101 solves the visual cognition task based on received plurality of data of the area from the head node. In an embodiment of the present invention, the visual cognition task solved by the computer system 101 can be the generation of real-time 3D models constructed from the video data obtained by the computer system 101 from the head node in the coalition.

One skilled in the art may appreciate that the aforementioned (centralized) optimization algorithm may require complete and centralized knowledge on the network topology. An advantageous alternative to the aforementioned optimization algorithm may be a distributed algorithm for coalition formation and re-configuration.

A distributed algorithm for coalition formation and re-configuration may have several advantages over the centralized optimization algorithm in dynamic situations in which either the nodes availability changes, or the visual cognition task requirements change as a result of a dynamic event, for example, when the task is based on previously detected events or when the task is inherently distributive in nature, for example, detection and tracking of enemy agents in wide-area battlefield scenario. Examples of the previously detected event are: determination of the change in visibility of the area due to weather conditions (e.g., fog, darkness, etc.), determination that some of the nodes don't have enough battery resource to initiate, continue, or complete the assigned task, determination that some of the nodes are out of range to be able to continue or complete the assigned task, etc., determination that the request for images was amended to required a higher resolution images than it was initially requested. Other examples may include previously detected higher-level cognitive events including change in number or location of enemy detected and tracked in the battlefield scenario. The foregoing examples are to be understood as being in every respect illustrative but not restrictive.

Figure 4:
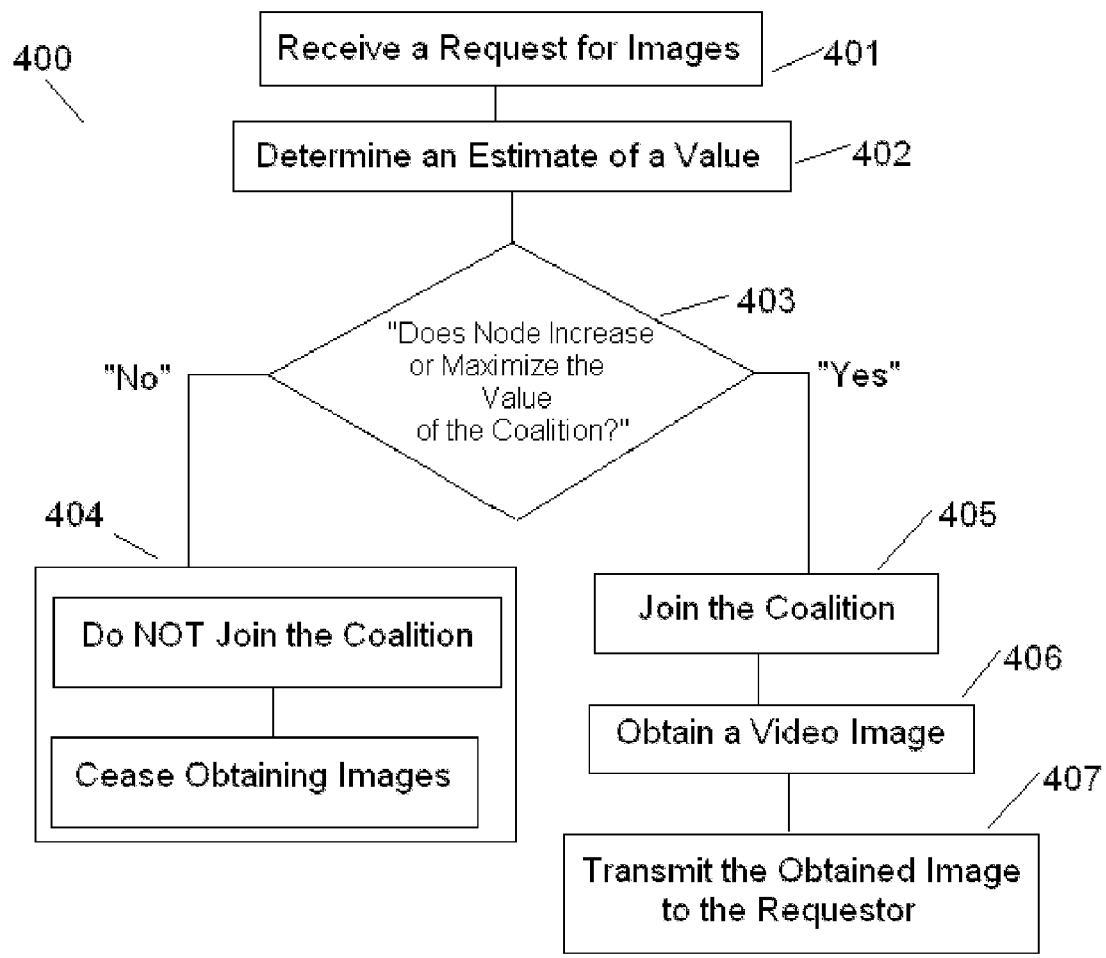
FIG. 4 illustrates a method for cooperative diversity 3D video sensing in wireless video sensor networks utilizing a Distributed Approach to Coalition Formation, according to another embodiment of the present invention.

FIG. 4 illustrates a method 400 utilizing a distributed approach to coalition formation for cooperative diversity visual cognition in a wireless video sensor networks according to an embodiment of the present invention.

At step 401, a request is received from the computer system 101, by the video sensor nodes, to execute a specified visual cognition task. The request may comprise a number of parameters. In one embodiment, that of 3D model reconstruction, such parameters may include quality (e.g., resolution) and type (e.g., continuous feed, snap-shot of the area, etc.) of the requested sensory data. In a possible implementation, the request message may be encoded and compressed before being transmitted to the plurality of video sensor nodes for the security and data integrity purposes, using any well-known encoding and compression techniques.

As illustrated at FIG. 2, the video sensor node comprises at least one processor, image-sensing input module, a signal communication receiver-transmitter, and power source. The processor of the video sensor node is configured to conduct a number of computation tasks based on received requests from the computer system 101. The image-sensing input module comprises at least one camera (may be high-resolution) configured to obtain a video or image of the area surrounding the video sensor node upon receiving a command from the processor. The signal communication receiver-transmitter is configured to receive commands from the computer system 101 and communicate data to the computer system 101. The signal communication receiver-transmitter is also configured to communicate with other video sensor nodes deployed in the area. It should be recognized that this example of the video sensor node is non-limiting and that any configuration of video sensor node components may be combined in any way in various embodiments. In some embodiments, for example, video sensor nodes may include any additional and/or desired components and/or configurations.

At step 402, upon receiving the request for the image of the area, the video sensor node determines the tradeoff between the performance metric for the visual cognition task (due to its contribution), a metric of energy consumption, and delay in transmitting the obtained image. In one embodiment, the video sensor node calculates this tradeoff to determine whether it will generate and transmit data of desired quality with minimal delay while consuming minimal energy. Calculating the tradeoff among several metrics requires using metrics and concepts from the coalitional game theory framework. In this framework, nodes are identified as independent players that follow a merge-split algorithm for joining coalitions, where the split-merge algorithm serves the purpose of identifying whether participating of any given node in the coalition would locally optimize the performance of the coalition. As may be appreciated, the foregoing and subsequent steps of method 400 describe the steps performed by the single video sensor node. In an advantageous embodiment of the present invention, the steps of method 400 are repeatedly performed by each of the plurality of video sensor nodes.

Each player (node) will decide to enter the coalition or not, based on an estimate of its contribution to the coalition, which could be characterized by a metric such as the Shapley value. The Shapley value represents the average payoff to the players if the players are entered in completely random order, and for player i is given as $$\phi_i = \sum_{S \subset N, i \in S} \frac{(|S|-1)!(n-S)!}{n!} [v(S) - v(S-i)],$$

the summation is over all coalitions S that contain user i, n is the number of nodes, and N is the set of nodes. v(S)−v(S−i) is the amount by which the value of coalition S increases when player i joins it. We note that the contribution of the node to the coalition could be determined using other different metrics that would be tailored for the specific application, with the Shapley value being a classic example.

At step 403, the video sensor node determines whether, as a result of the calculation of the optimal tradeoff, this particular node's participation in the coalition will increase the value of the coalition, with the goal of maximizing the coalition value, which means optimizing the performance metric associated with the visual cognition task (for example, (3D image/video reconstruction) based on the plurality of received images, while keeping the energy consumption and latency to a minimum. If the video sensor node determines that its participation in the coalition will not increase the value of the coalition, the method proceeds to step 404. At step 404, the video sensor node does not join the coalition and, hence, does not obtain image data and transmit computed data to the computer system 101 in order to conserve its resources for future tasks.

If the video sensor node determines, at step 403, that its participation in the coalition will improve the value of the coalition, the method proceeds to step 405. At step 405, the video sensor node will join the coalition of other video sensor nodes which were also recipients of the request and which also determined that their participation in the coalition will maximize the value of the coalition. Joining the coalition of video sensor nodes means initiating a corroborative task in sensing, gathering, computing and exchanging data among the nodes that are engaged in a completion of the request for servicing the visual cognition task.

At step 406, in response to joining the coalition, the video sensor node obtains images of the area via image-sensing input module 202.

At step 407, the video sensor node performs relevant analytics on the obtained data and transmits the relevant data to the computer system 101 or to the head node. In an advantageous embodiment, the nodes within the formed coalition may themselves designate one of the nodes to be the head node for the purposes of collecting obtained data, performing further analytics if necessary, and transmitting the computed data to the computer system 101. As may be appreciated, the computer system 101 will finally service the visual cognition task assigned to it—for example, construct 3D model of the area using the received data pertaining to the area from a plurality of video sensor nodes within the coalition.

In an embodiment of the present invention, video sensor nodes within the formed coalition are configured to exchange data which may comprise "handshaking" wireless signals, video data, and other sensory metadata. In some embodiments, video sensor nodes within the coalition may dynamically disjoin the coalition based on dynamic determination that their participation in the coalition will no longer increase the value of the coalition. It should be recognized that the decision by any given video sensor node within the coalition to disjoin the coalition may also be based on dynamic analysis of the data received from other video sensor nodes within the coalition.

As may be appreciated, the distributed algorithm for coalition formation and re-configuration raises issues of real-time multi-view 3D reconstruction and multi-view 3D-based video analytics in unconstrained, outdoor environments on a resource-constrained, ad-hoc wireless camera sensor network.

According to an embodiment of the present invention, a solution is to implement optimal trade-off between performance metrics associated with the cognition task (for example, 3D reconstruction quality) and a number of other network resource constraints. In one possible implementation, several sub-problems are solved to implement the optimal tradeoff calculation.

According to an embodiment of the present invention, the optimal tradeoff calculation problem entails the following sub-problems: (P1) automatic network configuration or initialization followed by visual cognition tasks. The visual cognition task may involve (P2) 3D reconstruction (model building) optionally followed by (P3) higher level cognition tasks required for ISR. In this embodiment, a solution to the stated sub-problems can be achieved by application of the decentralized, on-demand, collaborative, multi-player game-theoretic strategy in addressing the challenges induced by the ad-hoc WSN framework.

In this embodiment, two assumptions are made in relation to the plurality of video sensor nodes described above. (i) Each video sensor node communicates to its peers pre-coded, handshaking wireless signals, video and other computed data as well as other sensory metadata. (ii) The image-sensing input module of each node comprises a stereo head collecting temporally synchronized pair of images using which the computation unit is capable of constructing a local 3D model. The (P1) sub-problem is rapidly solved by a novel algorithm that statistically fuses together network localization approaches with feature-point based sparse 3D reconstruction approaches for an estimate of network geometry with extrinsic calibration of the cameras of the image-sensing input modules. This calibration step facilitates the usage of predictive models for feature point localization and enables the use of frustum culling methods and level of detail (LOD) representations for sparse, on-demand, data communication reducing the cost of sharing such data for any given task.

In one embodiment, the following scenario is used for solving any cognitive task (X): This task may refer to either P2 or P3 above. Each video sensor provides independent information about the observed area. Furthermore, since the sensor fields-of-view are known, the subsets of sensors, for which any volume in the 3D world is visible, is known. This allows predicting the subset of sensor nodes that provide positive information about X. These can now be co-opted into coalitions to solve for task X as described above in connection with the method of FIG. 4. It should be recognized that the described strategy can be represented in a Bayesian network.

As a result, an information-theoretic quality of service (QoS) cost may be defined for any generic vision task X. For example, X is a random variable representing the vision task (e.g., estimation of camera calibration parameter/depth and texture of a point/foreground motion/presence of a foreground object, etc.) and $\rho_i$ is some relevant statistical estimator for sensor node i. Further, S is set to be the coalition to which this node contributes and $\rho_S$ is set to be the estimator for coalition S. Then, the additional value of node i to the coalition S for solving the task X may be represented by the increase in the mutual information: $I(X; \rho(S)) - I(X; \rho(S-i)) = I(X; \rho(S|\phi_i=1)) - I(X; \rho(S|\phi_i=0))$. Thus, the function may be presented as $v(S|\phi) = I(X; \rho(S|\phi))$.

Estimating $\delta_\phi I(X; \rho(S|\phi))$: For general probability density functions (pdfs), it is very burdensome to specify incremental gains from additional sensor data for specific vision tasks. To simplify this problem, conditional independence of the sensor nodes and a consequent factorization should preferably be assumed. The offline performance characterization of the estimators and identification of indexing functions from data to pdf representing the estimator performance is to be calculated separately by using standard regression techniques from machine learning. For example, for the problem of depth estimation from stereo for a feature, a function that maps from the quality of the feature and disparity to a posterior pdf on the inverse-depth is straightforwardly identifiable.

Limited Mobility: As may be appreciated, augmentation of the sensors with limited mobility (orientation and small location changes) is also straightforward. Proposed steps allow modification of the sensor configuration to actively solve the problem of optimal 3D coverage for the sensor network subject to quality and energy constraints.

As may be readily appreciated, the embodiments of the present invention are directed at solving the following problems from distributed and cooperative visual cognition perspective: (i) Multimodal, multi-sensor calibration using cooperative sensing; Optimal Selection of correspondences for constrained, large-scale Structure from Motion (SfM); Maximizing coverage-quality tradeoff (for task X) given specific energy constraints under restricted mobility constraints; Real-time dense 3D modeling from multiple video streams over large areas; and Theoretical formulation of information-gain for cooperative sensors networks for visual tasks X (3D reconstruction).

Figure 5:
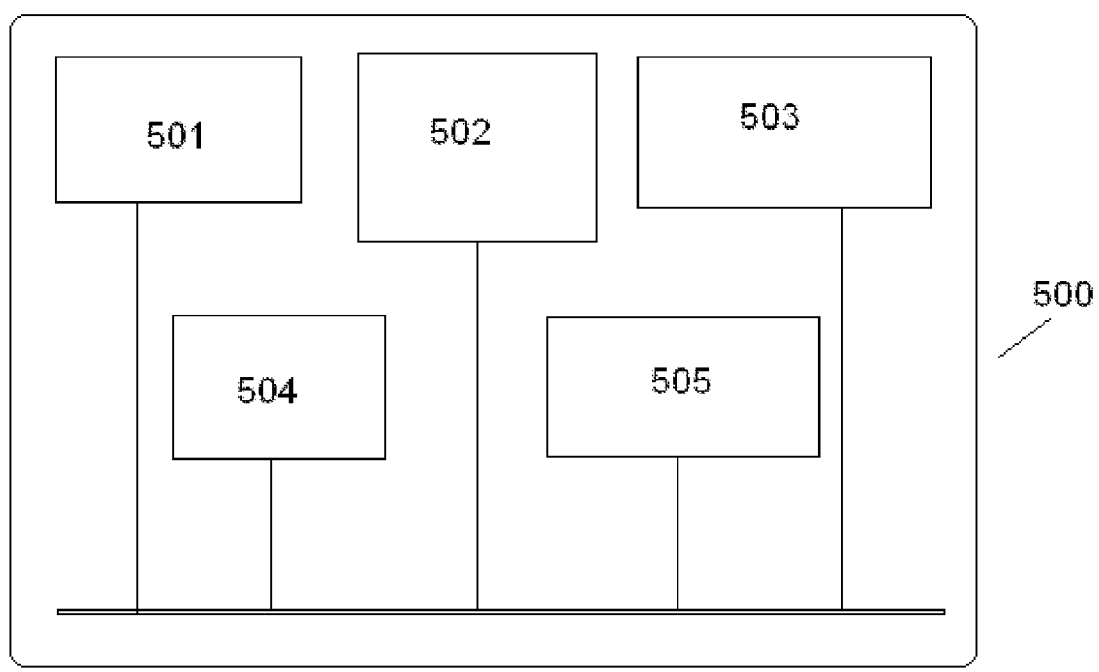
FIG. 5 illustratively depicts components of a computer that may be used to implement the invention.

FIG. 5 is a high-level block diagram of an exemplary computer that may be used for implementing cooperative diversity visual cognition in wireless video sensor networks. Computer 5600 comprises a processor 501 operatively coupled to a data storage device 502 and a memory 503. Processor 501 controls the overall operation of computer 500 by executing computer program instructions that define such operations. The computer program instructions may be stored in data storage device 502, or other computer readable medium, and loaded into memory 503 when execution of the computer program instructions is desired. Thus, the steps of FIGS. 1, 2, 3, and 4 can be defined by the computer program instructions stored in memory 503 and/or data storage device 502 and controlled by processor 501 executing the computer program instructions. For example, the computer program instructions can be implemented as computer executable code programmed by one skilled in the art to perform an algorithm defined by the method steps of FIGS. 3 and 4. Accordingly, by executing the computer program instructions, the processor 501 executes an algorithm defined by the method steps of FIGS. 3 and 4. Computer 500 also includes one or more network interfaces 505 for communicating with other devices via a network. Computer 500 also includes one or more input/output devices 504 that enable user interaction with computer 500 (e.g., display, keyboard, mouse, speakers, buttons, etc.).

Processor 501 may include both general and special purpose microprocessors, and may be the sole processor or one of multiple processors of computer 500. Processor 501 may comprise one or more central processing units (CPUs), for example. Processor 501, data storage device 502, and/or memory 503 may include, be supplemented by, or incorporated in, one or more application-specific integrated circuits (ASICs) and/or one or more field programmable gate arrays (FPGAs).

Data storage device 502 and memory 503 each comprise a tangible non-transitory computer readable storage medium. Data storage device 502, and memory 503, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 505 may include peripherals, such as a printer, scanner, display screen, etc. For example, input/output devices 504 may include a display device such as a cathode ray tube (CRT), plasma or liquid crystal display (LCD) monitor for displaying information to the user, a keyboard, and a pointing device such as a mouse or a trackball by which the user can provide input to computer 500.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for cooperative diversity visual cognition in a wireless sensor network comprising:
   receiving, by at least one video sensor node deployed in an area, a request for a video image of the area for a visual cognition task;
   determining, by the at least one video sensor node, an estimate of a performance metric of the at least one video sensor node for the visual cognition task based on a contribution of the at least one video sensor node to a value of a communicative coalition of video sensor nodes associated with the visual cognition task;
   determining, by the at least one video sensor node, whether to join the communicative coalition of video sensor nodes associated with the visual cognition task based on the determined estimate of the performance metric of the at least one video sensor node; and
   in response to a determination to join the communicative coalition by the at least one video sensor node, obtaining and transmitting to a requestor the video image of the area,
   wherein the step of determining, by the at least one video sensor node, whether to join the communicative coalition of video sensor nodes associated with the visual cognition task comprises:
   declining, by the at least one video sensor node, to join the communicative coalition in response to determining that the contribution of the at least one video sensor node to the value of the communicative coalition associated with the visual cognition task does not increase a total performance metric of the communicative coalition associated with the visual cognition task.

2. The method of claim 1, wherein declining to join the communicative coalition comprises declining to obtain and transmit the data to the requestor.

3. The method of claim 1, wherein the step of determining the estimate of the performance metric, by the at least one video sensor node, comprises:
   determining at least one metric, the at least one metric being an optimal tradeoff between a detriment and a benefit associated with the at least one video sensor node in the contribution to the value of the communicative coalition associated with the visual cognition task.

4. The method of claim 3, wherein the at least one metric is the Shapley value.

5. The method of claim 1, wherein determining the estimate of the performance metric comprises executing a merge-split algorithm for determining a coalitional structure.

6. The method of claim 1, wherein the step of determining, by the at least one video sensor node, whether to join the communicative coalition comprises:
   determining to join the communicative coalition when the estimate of the performance metric indicates that the at least one video sensor node increases a total performance metric of the communicative coalition associated with the visual cognition task.

7. The method of claim 6, wherein the total performance metric of the communicative coalition associated with the visual cognition task is equal to an estimate of an aggregated performance metric of a plurality of video sensor nodes within the communicative coalition.

8. The method of claim 1, further comprising:
   if the at least one video sensor node determines to join the communicative coalition, exchanging data, by the at least one video sensor node, with the at least one other video sensor node in the area.

9. The method of claim 8, wherein exchanging the data with the at least one other video sensor node in the area comprises exchanging sensory metadata.

10. The method of claim 9, wherein the request is associated with a plurality of characteristics, and the plurality of characteristics associated with the request comprises:
the performance metric associated with the visual cognition task, a metric of energy consumption, and delay in transmitting the video image to the requestor.

11. The method of claim 6, further comprising:
subsequent to the joining the communicative coalition, disjoining, by the at least one video sensor node, the communicative coalition in response to determining that the performance metric of the at least one video sensor node no longer increases the total performance metric of the communicative coalition associated with the visual cognition task.

12. A video sensor node for cooperative diversity visual cognition in a wireless sensor network, the video sensor node comprising:
a processor; and
a memory storing computer program instructions, which when executed by the processor cause the processor to perform operations comprising:
receiving a request for a video image of an area in which the video sensor node is deployed for a visual cognition task;
determining an estimate of a performance metric of the video sensor node for the visual cognition task based on a contribution of the video sensor node to a value of a communicative coalition of video sensor nodes associated with the visual cognition task;
determining whether to join the communicative coalition of video sensor nodes associated with the visual cognition task based on the determined estimate of the performance metric of the video sensor node; and
obtaining and transmitting to a requestor the video image of the area in response to a determination to join the communicative coalition,
wherein determining whether to join the communicative coalition of video sensor nodes associated with the visual cognition task comprises:
declining to join the communicative coalition in response to determining that the contribution of the at least one video sensor node to the value of the communicative coalition associated with the visual cognition task does not increase a total performance metric of the communicative coalition associated with the visual cognition task.

13. The video sensor node of claim 12, wherein the operations further comprise:
exchanging data with at least one other video sensor node in the area in response to joining the communicative coalition.

14. The video sensor node of claim 12, wherein the operations further comprise:
subsequent to the joining the communicative coalition, disjoining the communicative coalition in response to determining that the performance metric of the video sensor node no longer maximizes a total performance metric of the communicative coalition associated with the visual cognition task.

15. A non-transitory computer readable medium storing computer program instructions for cooperative diversity visual cognition in a wireless sensor network, the computer program instructions, when executed, cause a processor to perform a method comprising:
receiving, by at least one video sensor node deployed in an area, a request for a video image of the area for a visual cognition task;
determining, by the at least one video sensor node, an estimate of a performance metric of the at least one video sensor node for the visual cognition task based on a contribution of the at least one video sensor node to a value of a communicative coalition of video sensor nodes associated with the visual cognition task;
determining, by the at least one video sensor node, whether to join the communicative coalition of video sensor nodes associated with the visual cognition task based on the determined estimate of the performance metric of the at least one video sensor node; and
in response to a determination to join the communicative coalition by the at least one video sensor node, obtaining and transmitting to a requestor the video image of the area,
wherein the step of determining, by the at least one video sensor node, whether to join the communicative coalition of video sensor nodes associated with the visual cognition task comprises:
declining, by the at least one video sensor node, to join the communicative coalition in response to determining that the contribution of the at least one video sensor node to the value of the communicative coalition associated with the visual cognition task does not increase a total performance metric of the communicative coalition associated with the visual cognition task.

16. The non-transitory computer readable medium of claim 15, wherein the step of determining the estimate, by the at least one video sensor node, comprises:
determining at least one metric, the at least one metric being an optimal tradeoff between a detriment and a benefit associated with the at least one video sensor node in the contribution to the value of the communicative coalition associated with the visual cognition task.

17. The non-transitory computer readable medium of claim 15, wherein determining the estimate comprises:
executing a merge-split algorithm for determining a coalitional structure.

18. The non-transitory computer readable medium of claim 15, wherein the step of determining, by the at least one video sensor node, whether to join the communicative coalition comprises:
determining to join the communicative coalition when the estimate of the performance metric indicates that the at least one video sensor node increases a total performance metric of the communicative coalition associated with the visual cognition task.

19. The non-transitory computer readable medium of claim 18, wherein the total performance metric of the communicative coalition associated with the visual cognition task is equal to an estimate of an aggregated performance metric of a plurality of video sensor nodes within the communicative coalition.

20. The non-transitory computer readable medium of claim 15, further comprising, in response to joining the communicative coalition, exchanging data, by the at least one video sensor node, with the at least one other video sensor node in the area.

21. The non-transitory computer readable medium of claim 20, wherein exchanging the data with the at least one other video sensor node in the area comprises exchanging sensory metadata.

22. The non-transitory computer readable medium of claim 21, wherein the request is associated with a plurality of characteristics, and the plurality of characteristics associated with the request comprises:
   the performance metric associated with the visual cognition task, a metric of energy consumption, and delay in transmitting the video image to the requestor.

23. The non-transitory computer readable medium of claim 15, wherein declining to join the communicative coalition comprises declining to obtain and transmit the video image of the area to the requestor.

24. The non-transitory computer readable medium of claim 18, further comprising:
   subsequent to the joining the communicative coalition, disjoining, by the at least one video sensor node, the communicative coalition in response to determining that the performance metric of the at least one video sensor node no longer increases the total performance metric of the communicative coalition associated with the visual cognition task.

* * * * *